United States Patent
Trammell

[15] 3,647,987

[45] Mar. 7, 1972

[54] CASSETTE RECORDING SYSTEM USING NOTCHED CASSETTES

[72] Inventor: James R. Trammell, Parma Heights, Ohio

[73] Assignee: Scanfax Systems Corporation, New York, N.Y.

[22] Filed: Jan. 5, 1970

[21] Appl. No.: 698

[52] U.S. Cl. ....................................... 179/100.2 Z, 274/4 C

[51] Int. Cl. ................................... G11b 15/04, G11b 23/08

[58] Field of Search ............. 179/100.2 Z, 100.2 D; 274/4 B, 274/4 C, 4 E, 4 F, 4 G, 11 B, 11 C

[56] References Cited

UNITED STATES PATENTS

| | | | |
|---|---|---|---|
| 3,167,267 | 1/1965 | Crane | 274/4 E |
| 3,394,899 | 7/1968 | Schoenmakers | 274/4 C |
| 3,417,938 | 12/1968 | Markakis | 274/11 C |

*Primary Examiner*—Terrell W. Fears
*Assistant Examiner*—Jay P. Lucas
*Attorney*—Amster & Rothstein

[57] ABSTRACT

In a magnetic tape recording system, recording apparatus is described as including a cassette only with notches arranged to mate with locating pins disposed on both sides of a recording head in a cassette-receiving module for the system.

1 Claims, 6 Drawing Figures

INVENTOR.
James R. Trammell
BY Amster & Rothstein
AMSTER & ROTHSTEIN
ATTORNEYS

INVENTOR.
James R. Trammell

BY
Amster & Rothstein
AMSTER & ROTHSTEIN
ATTORNEYS

CASSETTE RECORDING SYSTEM USING NOTCHED CASSETTES

This invention relates primarily to a tape recording apparatus and more particularly to the construction of a cassette and cassette-receiving module.

The present invention is particularly useful with an apparatus and method for the preparation and transmission of audio information from an origin location to a first remote location (normally a library or other convenient depository), and then, in multiple copies of such audio information, the dissemination thereof to a plurality of further remote locations. To more particularly describe this method of information flow, the contemplated origin location is a recording studio with the necessary recording equipment for reproducing audio information on tapes. The audio information which is recorded may be in the form of a lecturer reading from a written manuscript, or the like. Following the recording of individual master tapes at the recording studio, the tapes are packaged in protective cassettes and placed in a convenient depository (such as a library) to reproduce the information of the master tape onto so-called "slave" tapes. A recording system capable of accommodating at least one and preferably more "slave" tapes in cassettes is provided for recording the program of a selected master tape at the depository (library). Such a system enables wide dissemination of audio information on the master tapes. The "slave" recordings are produced in cassettes and may then be reproduced or played back at further remote locations.

The invention as described herein is particularly useful in a recording system for producing multiple "slave" tape recordings from a master at the library location. It is essential during the operation at that location that the virtually irreplaceable master recordings not be erased unintentionally by overrecording such tapes and, further, that due to the extremely high speed of the contemplated recording system at the library location, the alignment between tapes in the "-slave" cassettes and the recording heads be extremely accurate to reduce any distortion problems that are largely aggravated by any misalignment in such high-speed systems.

Accordingly, a primary object of the present invention is to provide an efficient and reliable means by which the location of the tape in "slave" cassettes relative to the recording heads may be insured.

A further object of the present invention is to provide a means by which the overrecording of master tapes may be avoided.

These and other objects are accomplished in accordance with one illustrative embodiment of the present invention by a magnetic tape recording system including a cassette, the leading edge of one panel of which is provided to define V-notches for mating with locating pins disposed near the base of the cassette receptacle defined by the cassette-receiving module. The locating pins are disposed on either side of the recording head, which is physically located near the base of the receptacle.

The above brief description, as well as further objects, features, and advantages of the present invention will be more fully appreciated by reference to the following detailed description of the preferred, but nonetheless illustrative embodiment when taken in conjunction with the accompanying drawings wherein.

Figure 1:
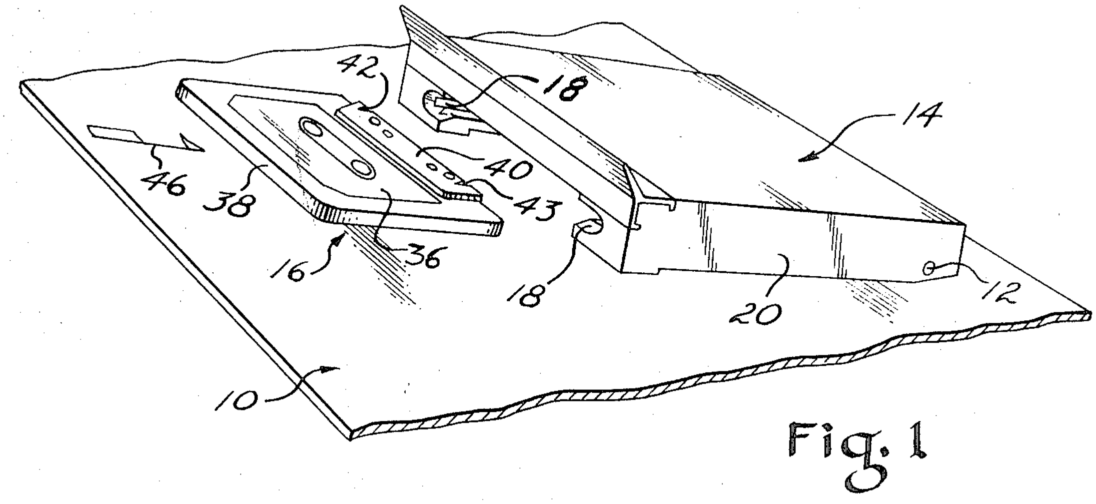
FIG. 1 is a front perspective view of the cassette-receiving module in upwardly tilted position for receiving the illustrated tape cassette according to the present invention.

Referring specifically to the drawings, part of a tape recording system operation panel, generally designated 10, is shown in FIG. 1, having mounted thereon by rotatable mounting means 12 or the like, a cassette-receiving module 14. The cassette-receiving module 14 is for holding a "slave" tape cassette 16 during a recording operation and thus defines a cassette-receiving receptacle 18 longitudinally thereof.

Figure 2:
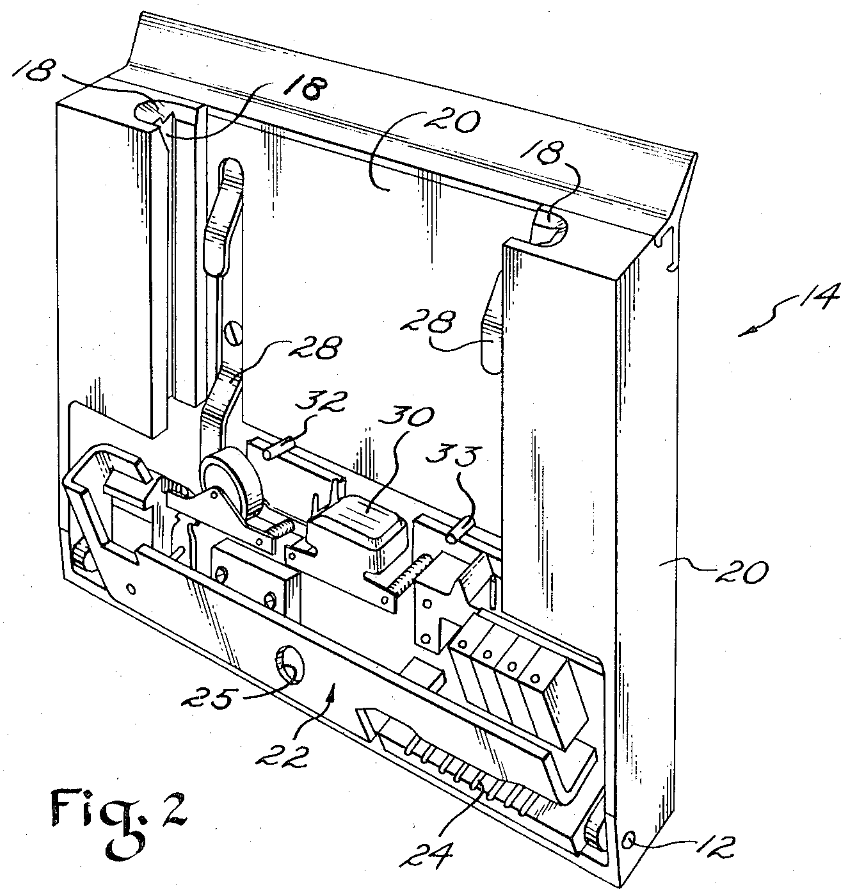
FIG. 2 is a bottom perspective view of the mechanism and structure of a cassette-receiving module, showing particularly the locating pins therein.

To describe the specific structure of the cassette-receiving module 14, FIG. 2 shows the module 14 as including rotatable mounting means 12 for connection of the module body 20 to a base member generally designated 22. The base member 22 has attached thereto various electronic and structural components as well as connecting means 24 for the electronic components. The base member 22 defines a bore 25 through which an idler shaft (not shown) protrudes. Means are also provided for anchoring the base 22 to the recording system operational panel 10.

The main body 20 of the cassette-receiving module 14 further includes locating springs 28 for assisting insurance of proper location of the tape cassette 16 with respect to the recording head 30, which is affixed to the main body member 20 of the cassette-receiving module. Locating pins 32, 33 are disposed at each side of the recording head and protrude from the main body 20 of the module 14.

Figure 5:
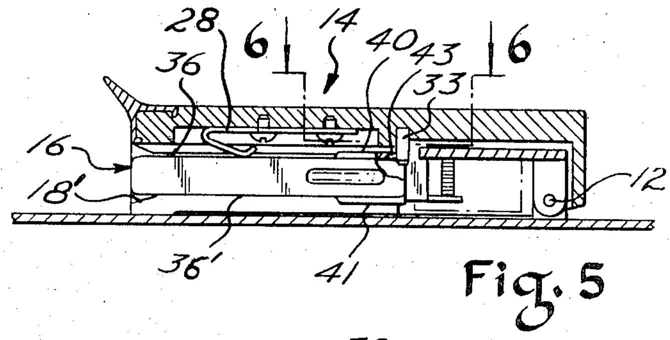
FIG. 5 is a side, sectional view taken along line 5—5 of FIG. 4 showing particularly the relationship of the cassette V-notches and the locating pins of the cassette-receiving module; and, FIG. 6 is a top, partially sectional view of a tape cassette and its position relative to a recording head.

Referring specifically to FIG. 5, further features of the cassette-receiving module 14 are shown as including a spring 28 for further insuring desired location of the tape cassette 16 in the receptacle 18. Also, the cassette-receiving module 14 defines a mouth 18' with sloping walls for facilitating entry of the cassette 16 to the cassette-receiving module 14.

Figures 3, 4:
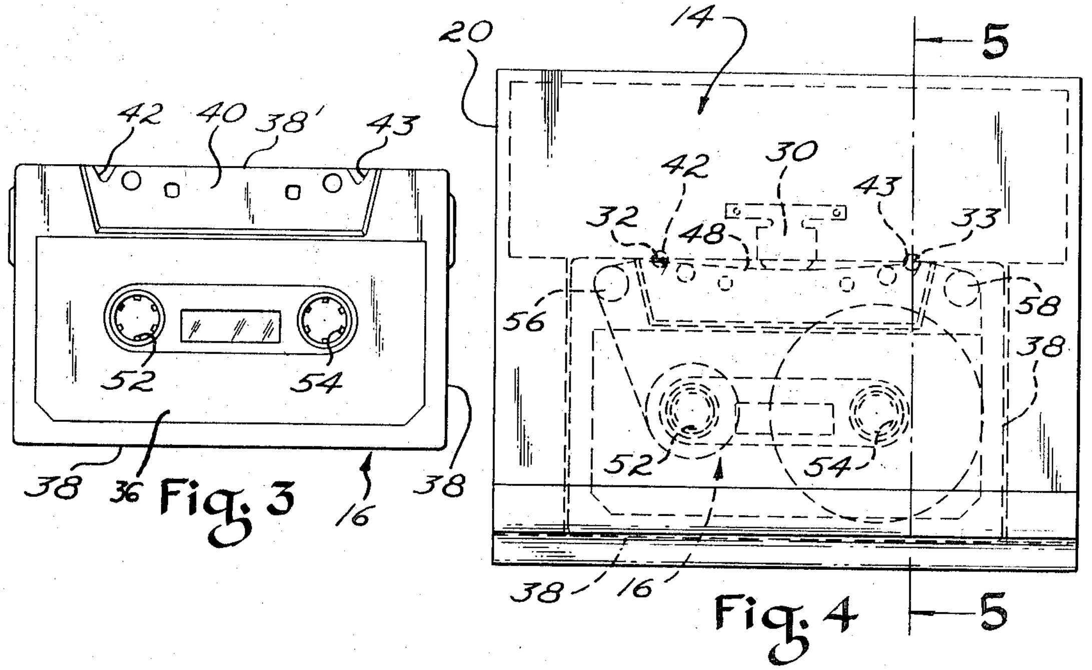
FIG. 3 is a top view of a tape cassette according to the present invention.
FIG. 4 is a top view of a cassette-receiving module with a "-slave" cassette inserted thereto in recording position.

The cassette 16 is shown particularly in FIGS. 1 and 3 as including a top wall 36, edge walls 38, a bottom wall 36', and an enlarged portion 40 located at the leading edge (during insertion) of the top wall 36, which defines V-notches 42, 43, matable respectively with locating pins 32, 33 of the cassette-receiving module 14. Master tape cassettes are devoid of such notches and would thus be rejected by a "slave" cassette-receiving receptacle 18 as described therein to insure against overrecording.

It may be seen by reference to FIGS. 4 and 5, particularly, the actual mating relationship between V-notches 42, 43 and locating pins 32, 33 after insertion of the tape cassette 16 to the cassette receiving module 14.

Figure 6:
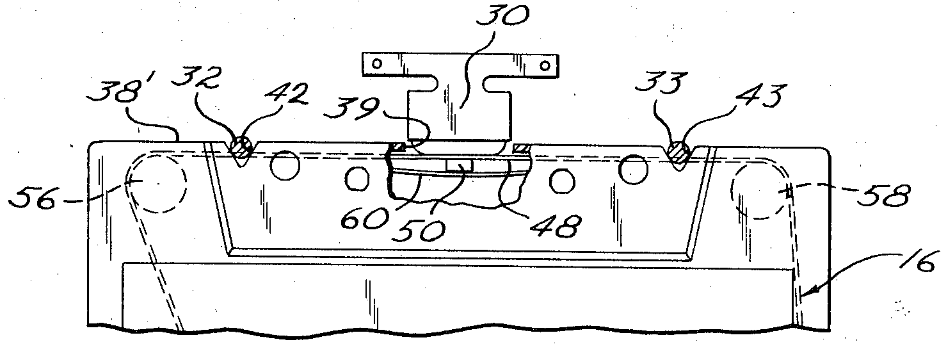

In order to provide a more complete description of the present invention, a typical operating sequence will now be described. Referring first to FIG. 1, the cassette-receiving module 14 is tilted slightly upwardly about rotatable mounting means 12 in order to provide easy access for the tape cassette 16 to the receptacle 18 of the cassette-receiving module 14. The cassette 16 is then inserted to the cassette-receiving module in the direction of arrow 46 of FIG. 1, the cassette 16 being disposed in an orientation so that the V-notches 42, 43 thereof enter the receptacle 18 first. The cassette is bottomed in the receptacle 18 so that the V-notches 42, 43 mate with the locating pins 32, 33 to thereby dispose the tape 48 (FIG. 6) in relationship to the recording head 30 for proper operation of the recording system without unwanted distortion. It may be seen that the provision of V-notches 42, 43 on the top wall 36 only of the cassette 16 insures against inverted insertion of the cassette. An inverted cassette would be unable to bottom in the receptacle for recording proximity to the recording head 30. A felt pad 50, or the like, is used in the cassette 16, as shown in FIG. 6, to provide the proper pressure on the tape 48 as it slides past the recording head 30. The spring 60 located beneath felt pad 50 provides a pressing force to pad 50. The tape motion is provided by a motor and mechanism (not shown) to drive spindles 52, 54 (FIG. 3) and the tape is located with respect to the recording head by means of pulleys 56, 58 shown in FIG. 6.

A further feature of a cassette 16 constructed according to the present invention is shown in FIG. 6 as an edge wall 38' of the cassette 16 defining an opening 39 for exposure of the tape 48 to the recording head 30.

What I claim is:

1. A tape recording system including a tape cassette and a cassette-receiving module for defining a cassette-receiving receptacle, said system comprising a top wall for said cassette, said top wall having an enlarged leading edge defining a pair of V-shaped notches, a pair of locating pins positioned at the base of said receptacle in mating relationship with said notches upon insertion of said cassette to said receptacle, and a recording head located at the base of said receptacle between said locating pins, said mating relationship insuring substantially distortion-preventing position of said cassette with respect to said recording head and insuring against over-recording of cassettes devoid of said notches, the location of said notches insuring against an inverted orientation of said cassette during said insertion.

* * * * *